(12) United States Patent
Bakos et al.

(10) Patent No.: US 11,256,091 B2
(45) Date of Patent: *Feb. 22, 2022

(54) DYNAMIC OBJECTS IN VIRTUAL REALITY ENVIRONMENTS

(71) Applicant: ADVERTY AB, Stockholm (SE)

(72) Inventors: Niklas Bakos, Sköndal (SE); Niclas Kjellgren, Stockholm (SE)

(73) Assignee: ADVERTY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,778

(22) Filed: Nov. 3, 2020

(65) Prior Publication Data

US 2021/0048672 A1   Feb. 18, 2021

Related U.S. Application Data

(63) Continuation of application No. 16/499,258, filed as application No. PCT/EP2018/058052 on Mar. 29, 2018, now Pat. No. 10,859,829.

(30) Foreign Application Priority Data

Mar. 31, 2017   (SE) .................................. 1750400-2

(51) Int. Cl.
G02B 27/01        (2006.01)
G06F 3/01         (2006.01)
G06T 19/00        (2011.01)

(52) U.S. Cl.
CPC ............ G02B 27/017 (2013.01); G06F 3/011 (2013.01); G06F 3/017 (2013.01); G06T 19/006 (2013.01);

(Continued)

(58) Field of Classification Search
CPC .. G02B 27/017; G02B 27/0172; G02B 27/01; G02B 2027/014; G02B 2027/0138;
(Continued)

(56) References Cited

U.S. PATENT DOCUMENTS 9,024,972 B1      5/2015   Bronder et al.
2015/0169572 A1   6/2015   Taubman et al.
(Continued)

OTHER PUBLICATIONS

International Search Report and Written Opinion from corresponding International Patent Application No. PCT/EP2018/058052, dated Jun. 28, 2018, 9 pages.

(Continued)

*Primary Examiner* — Xuemei Zheng
(74) *Attorney, Agent, or Firm* — Tucker Ellis LLP

(57) ABSTRACT

A method for determining if an object has been observed by user, said object being rendered in a graphical environment provided to a user with a head-mounted device, where the computer generated graphical environment is able to change over time. The method includes a) determining if the geometric proportion S of the size of the object, in relation to the total field of view generated in the graphical environment, is larger than a predetermined threshold value ($S_{min}$), and, if S is larger than $S_{min}$, determining for how long time (T) that S is greater than $S_{min}$, and if T is greater than a predetermined time $T_{min}$, determining that the object has been observed by the user.

15 Claims, 9 Drawing Sheets

(52) U.S. Cl.
CPC ............... *G02B 2027/014* (2013.01); *G02B 2027/0138* (2013.01)

(58) Field of Classification Search
CPC .......... G02B 2027/0178; G06T 19/006; G06Q 30/0241; G06Q 30/02; G06Q 30/0201–30/0204; G06Q 30/0202; G06Q 30/0257; G06Q 30/0251; G06Q 30/0271–0273; G06Q 30/0281; G06Q 30/0278; G06Q 30/0245; G06F 3/012; G06F 3/011
See application file for complete search history.

(56) References Cited

U.S. PATENT DOCUMENTS

2017/0103572 A1* 4/2017 Lin ..................... G06T 19/003
2018/0063599 A1* 3/2018 Park ................... G06F 3/04815

OTHER PUBLICATIONS

International Preliminary Report on Patentability from corresponding International Application No. PCT/EP2018/058052, dated Jul. 19, 2019, 20 pages.
Written Opinion of the International Preliminary Examining Authority from corresponding International Application No. PCT/EP2018/058052, dated Feb. 19, 2019, 7 pages.

* cited by examiner

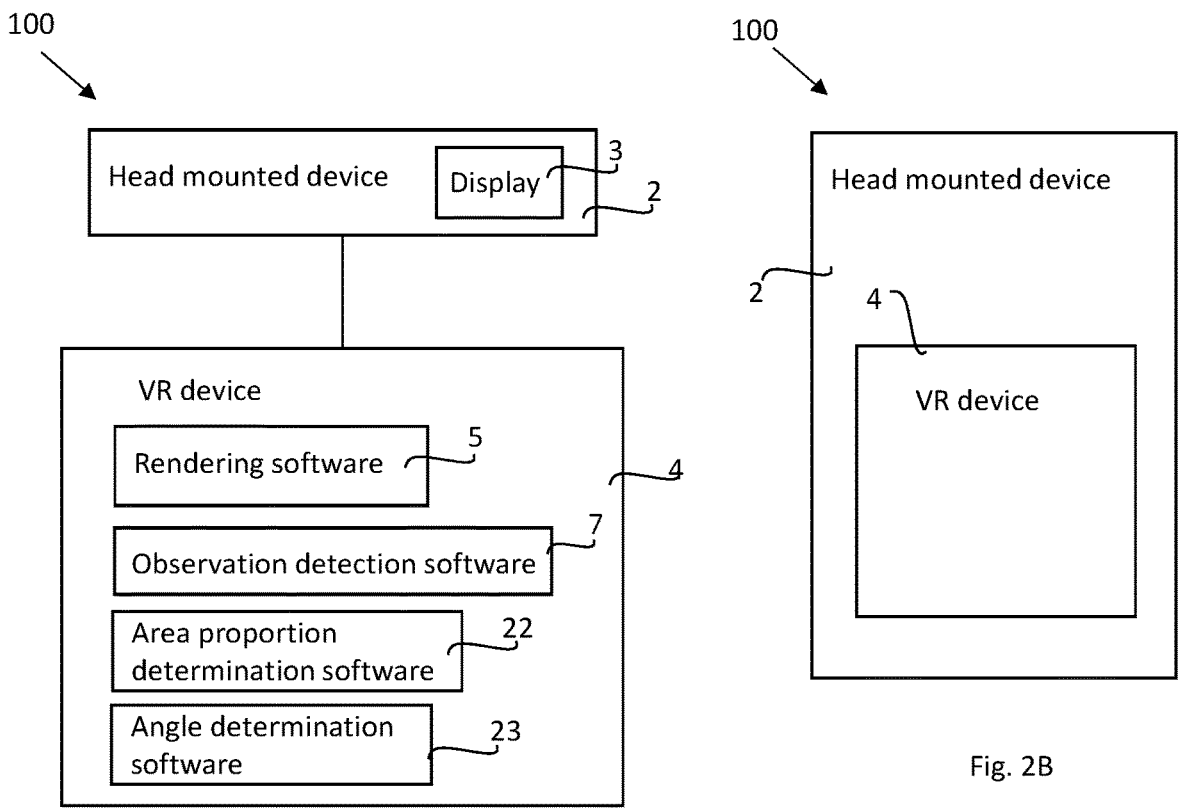
Fig. 2A
Fig. 2B
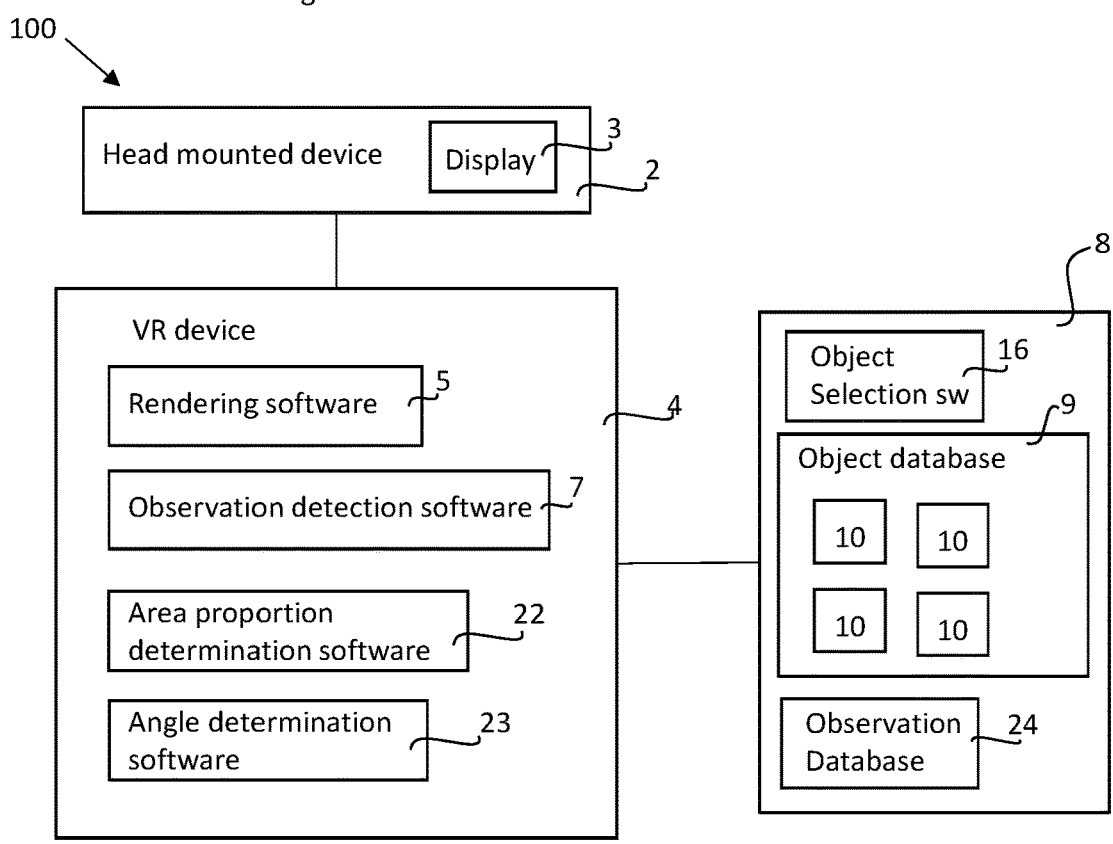
Fig. 3

US 11,256,091 B2

DYNAMIC OBJECTS IN VIRTUAL REALITY ENVIRONMENTS

RELATED APPLICATION DATA

This application is a continuation of U.S. patent application Ser. No. 16/499,258, filed Sep. 28, 2019, which is a National Phase of International Patent Application No. PCT/EP2018/058052, filed Mar. 29, 2018, and claims the benefit of Swedish Patent Application No. 1750400-2, filed Mar. 31, 2017, the disclosures of which are incorporated herein by reference in their entireties.

FIELD OF THE INVENTION

This invention relates to rendering and displaying virtual objects in three-dimensional environments, such as a virtual reality or an augmented reality environment, in particular the detection of whether a user has observed a specific virtual object rendered in such environments.

BACKGROUND

Advertising on web pages is often carried out with banners. It is difficult to know if users actually see the banners. The most reliable way to detect observation is if a user clicks on the banner.

Virtual reality and augmented reality is used more and more for games and applications. For virtual reality and augmented reality environments there is no reliable way to measure if a user has observed an advertisement.

Moreover, it would be desirable if visual objects, such as advertisements could be placed in graphical environments in a dynamic manner so that they fit in the context in which they are displayed.

SUMMARY OF INVENTION

In a first aspect of the invention there is provided a method for determining if an object rendered on a display has been observed by a user, said object being rendered in a computer-generated graphical environment provided to a user with a head-mounted device, the method comprising the steps of: a) determining the area of the display that is used to render the object, b) determining the proportion (S) of the area of step a) in relation to the total field of view generated in the graphical environment, c) determining if the object is larger than a predetermined threshold value ($S_{min}$), and, if S is larger than $S_{min}$, determining for how long time (T) that S is greater than $S_{min}$, and d) if T is greater than a predetermined time $T_{min}$, determining that the object has been observed by the user. As a user moves relative to the graphical environment the relative size of an object may change. The method has the effect of requiring that a user must have been able to observe an object with a certain size for a minimum amount of time before being registered as observed by the user. When these criteria are satisfied the object is automatically determined as viewed. This can be the bases for, for example, payment by an advertiser to someone who provides the graphical environment.

There may be multiple thresholds or S, each with a separate $T_{min}$ value, that each can trigger registration of observation. Generally, $T_{min}$ is shorter for higher thresholds of S, thus a small object has to be viewed a longer time in order to be classified as observed. Thus, in one embodiment there is a first threshold value $S_{min1}$ and a second threshold value $S_{min2}$ and where the method comprises i) determining for how long time S is larger than $S_{min1}$, and ii) determining for how long time S is larger than $S_{min2}$, and if the time determined in i) is greater than a predetermined time $T_{min1}$, or if the time determined in step ii) is greater than a predetermined time $T_{min2}$, determining that the object has been observed by the user, where $T_{min1} > T_{min2}$ when $S_{min1} < S_{min2}$.

$T_{min}$ may be, for example, from 0.2 seconds and 5 seconds. Suitable values of $S_{min}$ is, surprisingly, between 0.05% and 3% of the total field of view generated in the computer generated graphical environment where $S_{min}$ is determined by dividing the area of the object with the area of the total field of view.

S can be modified in different ways that take into account the angle of observation or the angle of the surface of the object.

For example where the graphical environment 1 is dependent on the direction of viewing of the user and where S may be modified by a coefficient K, where said coefficient K is selected based on the angle α between the horizontal direction of observation of the user in the computer generated graphical environment and the horizontal direction from the point of observation of the user to a predefined point on the object.

K can be constant for at least one interval of values of α. A constant value of K has the advantage of providing simpler processing, which is an advantage. K can for example be constant when α is larger or equal to 0° but smaller than an upper limit of from 15° to 30°. For example, K may be 1 when α is larger or equal to 0° but smaller than an upper limit of from 15° to 30°. This has the effect that an object that is almost in front of a user, is observed as an object that is exactly in front of the user. K may also be constant when α is larger than a lower limit of from 50° to 70°. For example, K may be 0 when α is larger than a value of from 50° to 70°. This has the effect of treating objects in the periphery of the field of view as never being observed by the user.

K may vary continuously over an interval of values for K may depend on cos α for at least one interval of values of α, for example when α is between a lower limit of from 15° to 30° and an upper limit of from 50° to 70°. K may be constant for at least some values of α and vary continuously for another interval of values of a, where the two intervals do not overlap.

In one embodiment where the object has a flat surface, the proportion S is modified by an incidence angle coefficient L, where L is selected based on the angle β between a vertical plane that is defined by the direction of observation 12 and a vertical plane that is perpendicular to the flat surface of the object. L may be constant for at least one interval of values of β. L may for example be constant when β is larger than or equal to 0° but smaller than an upper limit of from 50° to 70°. K may be equal to 1 when β is larger than or equal to 0° but smaller than an upper limit of from 50° to 70°. This has the effect of treating slightly tilted objects as non-tilted. K may also be constant when β is larger than a limit value of from 75° to 85°. K may be 0 when β is larger than a limit value of from 75° to 85. This has the effect of treating much tilted objects as never observed.

L may vary continuously over an interval of values for β. For example, L may depend on cos β for at least some values of β. L may for example dependent on cos β when β is between a lower limit of from 50° to 70° and an upper limit of from 75° to 85°. K may be constant for at least one interval of values of β and vary continuously for at least one other interval of values of β, where the two intervals do not overlap.

In a second aspect of the invention there is provided a system comprising a head-mounted device for rendering a graphical environment provided to a user on a display, said system comprising a computer with a memory, the memory comprising observation detection software and area proportion determination software, said area proportion determination software being configured to determine the area of the display that is used to render the object, and to determine the proportion (S) of the area in relation to the total field of view of the graphical environment, and configured to provide S to the observation detection software, said observation detection software being configured to receive S from the area determination software and configured to determine if S is larger than a predetermined threshold value ($S_{min}$), and configured to, if S is larger than $S_{min}$, determining for how long time (T) that S is greater than $S_{min}$, and configured to, if T is greater than a predetermined time $T_{min}$, determine that the object has been observed by the user.

In a third aspect of the invention there is provided a method for determining that an object has been observed by a user, said object being rendered in a virtual reality or augmented reality graphical environment provided to a user with a head-mounted device, the method comprising the steps of: a) determining the angle α between the horizontal direction of observation of the user in the computer generated graphical environment and a horizontal direction from the point of observation of the user to a predefined point on the object; or determining the angle β between a vertical plane that is defined by the direction of observation and a vertical plane that is perpendicular to the flat surface of the object, and b) using the angle α or the angle β to determine if the object has been observed by the user.

The method can be used to determine if an object likely has been observed or not observed by a user, without determining the area proportion.

In one embodiment it is determined that the object has been observed by the user if α is 0° or greater than 0°, but smaller than an upper limit of from 15° to 30°. In one embodiment it is determined that the object has been observed by the user if β is 0° or greater than 0° but smaller than an upper limit of from 50° to 70°. In one embodiment it is determined that the object has not been observed if α is larger than limit value of from 50° to 70°. In one embodiment it is determined that the object has not been observed if β is larger than a limit value of from 75° to 85°.

In a fourth aspect of the invention there is provided a system comprising a head-mounted device comprising a display, for rendering a virtual reality or augmented reality graphical environment provided to a user, said system comprising a computer, the computer comprising rendering software, observation detection software and angle determination software, said rendering software configured to render the graphical environment comprising at least one virtual object, said angle detection software configured to determine the angle α between the horizontal direction of observation of the user in the computer generated environment and a horizontal direction from the point of observation of the user to the rendered object, or configured to determine the angle β between a vertical plane that is defined by the direction of observation of the user and a vertical plane that is perpendicular to the flat surface of the object said angle determination software configured to provide the values for α or β to the observation detection software, said observation detection software configured to receive said values for α and β and configured to use α or β to determine if the object has been observed by the user.

In a fifth aspect of the invention there is provided a method for rendering an object in a computer generated graphical environment provided in a head mounted device, said computer generated graphical environment being generated by rendering software, the head mounted device being a part of a client which is able to communicate with a server, the rendering software comprising at least one placeholder that can be populated with a rendered object, said placeholder defining at least a location in the graphical environment, said placeholder being associated with least one piece of metadata, the method comprising the steps of: a) the client sending a request to a server before the graphical environment is to be rendered, said request comprising the metadata, and the server, using the metadata to select, from a plurality of instructions for rendering objects, an instruction for rendering an object, b) the server sending the selected instructions for rendering the object to the client, c) the client rendering the object at the predefined location in the graphical environment.

The placeholder may describe the shape or size of the object, and the selection of instruction in step a) may be made dependent on the size or shape of the object. The metadata may describe the context of the area surrounding the location of the placeholder, said context being selected from a plurality of predefined context classes. The metadata may describe the graphical properties of an area surrounding the placeholder. The metadata may describe whether the user is able to interact with the object in the graphical environment.

The request from the client may comprise information about at least one selected from: operating system of client, hardware of client, geographical location of the client, network provider, network technology and identity of client device.

The placeholder may have been defined by a second user before step a) has been carried out, the second user having defined the location of the placeholder in the graphical environment. The second user may have added at least one piece of metadata for the placeholder, said metadata defining the context of the placeholder.

After rendering of the object (step c) a step d) may be carried out where it is detected that the object has likely been observed by a user of the graphical environment, for example by a server selecting an instruction for an object and providing it to a VR device, the VR device rendering the object for a placeholder, and then detecting if the object has been observed by a user, by using any of the methods described herein, for example, by measuring T and/or S, or determining K or L, or by determining α or β only.

It is preferred that the client receives the instructions well in advance before rendering. Thus, it is preferred that the client sends the request to the server the latest when the client begins to render the graphical environment.

In a sixth aspect of the invention there is provided a system comprising a head-mounted device for rendering a graphical environment provided to a user on a display, where the head mounted device is a part of a client which is able to communicate with a server, where the client has a memory comprising rendering software configured to render the graphical environment on the display, where the rendering software comprises at least one placeholder that can be populated with a rendered object, said placeholder defining at least a location in the graphical environment, said placeholder being associated with least one piece of metadata, where the server has a memory comprising object selection software and an object database comprising a plurality of instructions for rendering objects, where the rendering software of the client is configured to send a request to the server before the graphical environment is to be rendered, said request comprising the metadata, and the object selection software of the server is configured to select, based on the metadata, from the object database, an instruction for rendering an object, the server being configured to send the selected instructions for rendering the object to the client, the client being configured to use the instructions to render the object at the predefined location of the placeholder in the graphical environment.

BRIEF DESCRIPTION OF DRAWINGS

The accompanying drawings form a part of the specification and schematically illustrate preferred embodiments of the invention and serve to illustrate the principles of the invention.

FIGS. 2A, 2B and 3 show a system.

DETAILED DESCRIPTION

Figure 1:
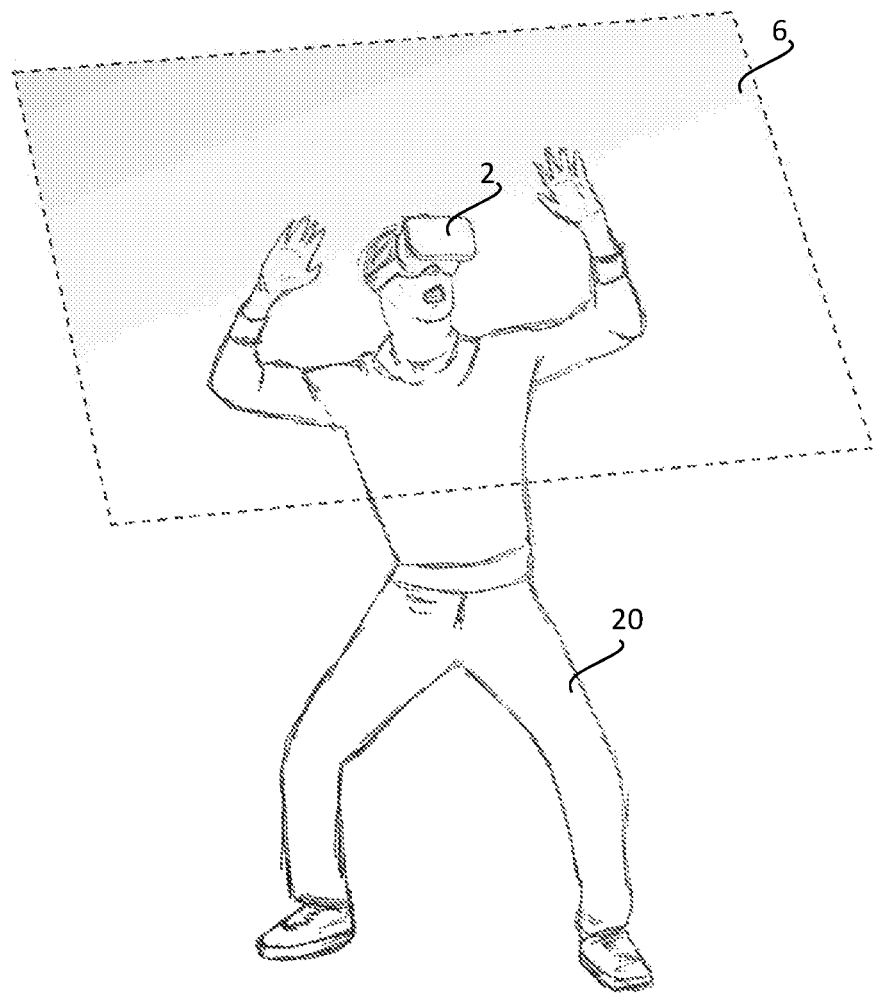
FIG. 1 shows a user with a head mounted device.
Figure 4:
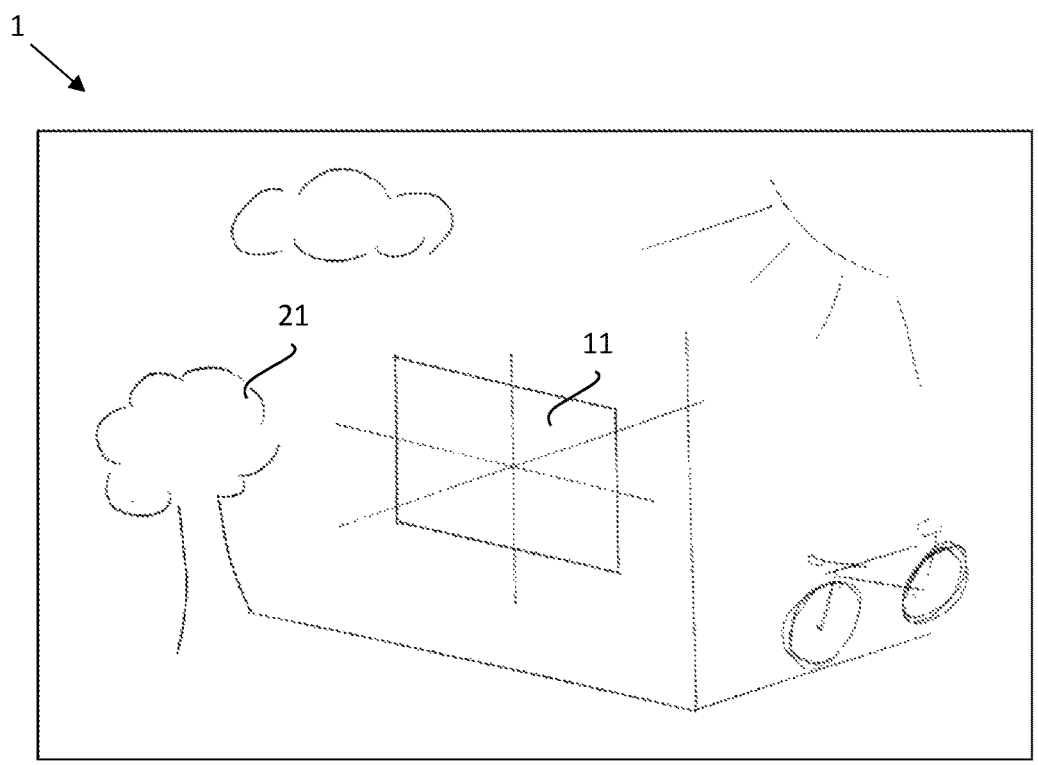
FIGS. 4-5 shows examples of a graphical environment.
Figure 5:
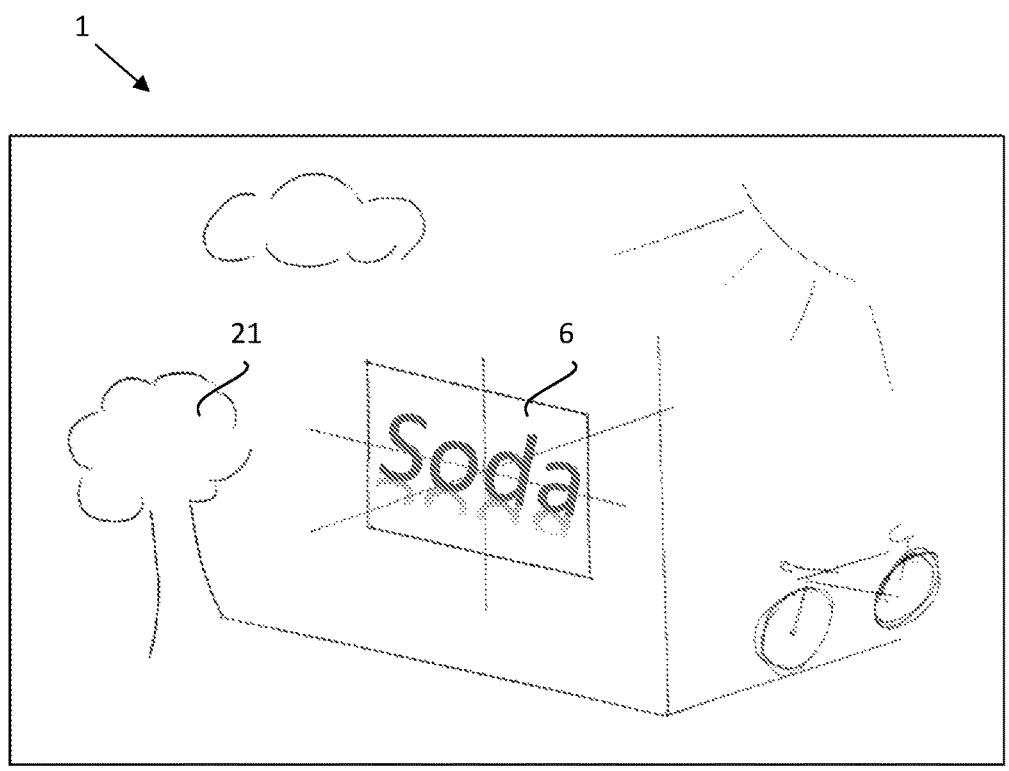

With reference to FIGS. 1-5, the invention relates to a computer-generated graphical environment 1 rendered to a user 20 in a head-mounted device 2. The user 20 experiences looking at an object 6, in this case a flat surface. Object 6 is shown with a dashed line indicating that it can be seen by a user 20 only. An object 6 is also shown in FIG. 5 as seen by the user 20 in the graphical environment 1. Graphical environment also comprises other objects such as object 21 which can also be observed by user 20. User 20 is a person that experiences the graphical environment 1 with a head mounted device 2.

The graphical environment 1 can be a rendered to the user 20 so that the user 20 experiences the graphical environment 1 as a three-dimensional environment. The device 2 is preferably a device that projects an image to the eyes at close range, preferably with one separate display or image for each eye. The device 2 may have at least one lens for providing the image at close range to the eyes.

With reference to FIGS. 2A, 2B and 3 the various embodiments described herein is generally carried out by system 100.

The graphical environment has a point of vision 13 (FIGS. 8-9) which is the position in the graphical environment 1 from which observation (virtually) takes place. This position may also be referred to as the "position of camera" or "position of the eye".

The head-mounted device 2 may be a virtual reality head mounted device, for example Daydream View, Gear VR, Oculus Rift, Vive or PSVR, or an augmented reality head mounted device such as HoloLens or Meta 2.

VR device 4 may be part of the head mounted device 2 such as in the case of Samsung Galaxy (FIGS. 1 and 2b), or a separate device connected to the head mounted device 2 with a cable. Communication may also occur wirelessly. VR device 4 may be a freestanding console such as PlayStation 4, a PC, to which a head mounted device 2 with a display 3 is connected. VR device 4 comprises a computer that comprises a processor and at least one memory.

The memory of the VR device 4 has rendering software 5 that is able to render images in the display 3 so that a user of the wearable device 2 seems to experience that he or she in a virtual reality graphical environment 1. Rendering of the graphical environment 1 is carried out as is known in the art.

Generally, a virtual reality environment or a augmented reality experienced in a head worn device provides an immersive experience to the user. Any type of environment can be rendered. The environment can for example be a part of a video/computer game, or the environment can for example be provided for educational purposes or be a model of a building made for a building project.

Objects 6 of the graphical environment 1 may be rendered to the user 20 by methods known in the art. Graphical environment may naturally also comprise other virtual objects such as object 21 which preferably are rendered in the same manner as object 6. Object 21 may for example be an object in a game or in a simulation.

Rendering software 5 should be seen as a functional unit. Rendering software 5 may be for example third party software, such as a video game, installed on VR device 4, cooperating with one or more software packages that are preinstalled on device 5, for example the operating system of device 4. Information for rendering a graphical environment may be stored on for example a DVD disc which can be read by a DVD player of VR device 4.

Rendering software 5 comprises or has access to instructions for rendering graphical environment 1, for example as a wire frame objects or other instruction for rendering objects or environments. Thus, graphical environment 1 may be partially or entirely made up of virtual objects 21. The instructions may comprise a "map" or a model of an environment, for example a city, a forest or the like. The map is preferably three-dimensional.

The memory of the VR device may also comprise observation detection software 7, area proportion determination software 22 and angle determination software 23, described in more detail below.

The position and/or the movements of the user 20 may be detected by the VR device 4, as is known in the art, for example with the use of at least one sensor, for example an accelerometer and/or a TOF camera or an IR camera. Preferably the VR device 4 and or head mounted device 2 can sense the direction of viewing of the user 20, i.e. the direction the user 20 is facing. This provides feedback to the VR device 4 so that the rendered graphical environment 1 may change. This gives the user the experience of moving in relation to the graphical environment 1. For example, if the graphical environment 1 renders an object 21, say, a tree, to the left of the user 20 (left as experienced by user 20), the user 20 is able to directly look at the tree by turning his head to the left. The user 20 may also experience moving through the graphical environment 1, for example by walking, driving a car or a spaceship. Hand held devices, or a sensor placed on the body of user 20 may also be used to detect the movements or position of the user 20.

Thus, the graphical environment 1 may be preferably able to change in real time as motions or movement of the user 20 relative to the graphical environment 1 is rendered in order to provide a virtual realty experience to the user. Thus, the graphical environment may able to change over time as some rendered objects 6, 21 become larger or smaller as the user 20 virtually moves in relation to the graphical environment 1. The graphical environment 1 preferably is dependent on the direction of viewing of the user in order to provide a virtual reality or augmented reality experience to the user.

Preferably the rendering software 5 comprises or has access to information 10 about objects 6, 21 in the graphical environment 1. Each object 6 may for example be defined by a three-dimensional wire frame model. An object 6 may also be defined as a flat surface as shown in FIG. 5, for example a flat surface of a three-dimensional object. The flat surface may have a defined size and shape.

It may be useful to detect if a user 20 of the graphical environment 1 likely has observed an object 6. This may be done with the aid of observation detection software 7 as described below.

Virtual object 6 is rendered by rendering software 5. Object 6 is rendered by activating selected pixels on the display 3 as is known in the art. Instructions 10 (i.e. data) for rendering the object 6 on display 3 may be provided in the rendering software 5 and/or from a server 8. The instructions 10 may comprise image information, text information and can include information about, shape, size, colour, texture, gloss, text, interactivity, and other information about the rendering of the object 6. The object 6 may be an advertisement, such as sign or a moving image. The object 6 may provide text, such as the name of a company or a logo. The object 6 may assemble real life signage, thus the object 6 may be a roughly rectangular area, but the object may of course have other shapes such as round, oval or triangular. The object 6 may be rendered as a flat surface or as a three-dimensional object. If the object 6 is a three-dimensional object it preferably has one flat surface that can be observed by the user 20. In a preferred embodiment the object 6 is a flat surface.

The VR device 4 may be connected to a server 8 so that digital information may be exchanged between the VR device 4 and the server 8. The server 8 may be any type of server 8, for example a virtual server. Thus, the server 8 may be constituted of several different physical server units, or parts of such units.

Server 8 may be a part of an ad-tech solution such that a number of clients are connected to server 8, and the clients sends requests to server 8 and receives instructions 10.

The VR device 4 may be a client in relation to the server 8. Connection between the VR device 4 and the server 8 may occur through any type of suitable network, such as the internet, and may be wire-bound or wireless. VR device 4 may send request to server 8 and server 8 may send instructions 10 to VR device 4. The server 8 may provide instructions 10 about an object 6 to be rendered in the graphical environment 1, for example advertisements, to the VR device 4. The VR device 4 may then render the object 6 in the graphical environment 1 with the use of display 3.

The server 8 may have a database 9 of instructions 10 for rendering objects 6. The server 8 may choose the object 6 to be rendered from a plurality of instructions 10 stored in the server 8. The server 8 may have object instruction selection software 16, for selecting an instruction 10 for a certain object 6 from a plurality of instructions 10 for objects 6. Server 8 may also have observation database 24 in which the number of observations for each object 6 is recorded.

It can be noted that instructions 10 for rendering object 6 generally may have the same format and be treated in the same manner by rendering software 5 as instructions for rendering object 21.

Above, a system 100 for virtual reality is described. The skilled person understands how to configure the system 100 for use in augmented reality. "Augmented reality" is similar to virtual reality but differs in that augmented reality shows virtual objects 6, 21 as well as at least a part of reality, where the image of the reality is typically captured with a real time video camera. The video camera is preferably directed in the direction of viewing of the user 20. Video captured by the camera is shown in real time on the display 3 together with at least one virtual object 6. System 100 for augmented reality is typically able to build a model of the real world with the use of tracking software. The model can be used for positioning objects 6, 21 such that they are experienced as a part of the real world with the use of the display 3 of the head worn device 2.

Figure 6:
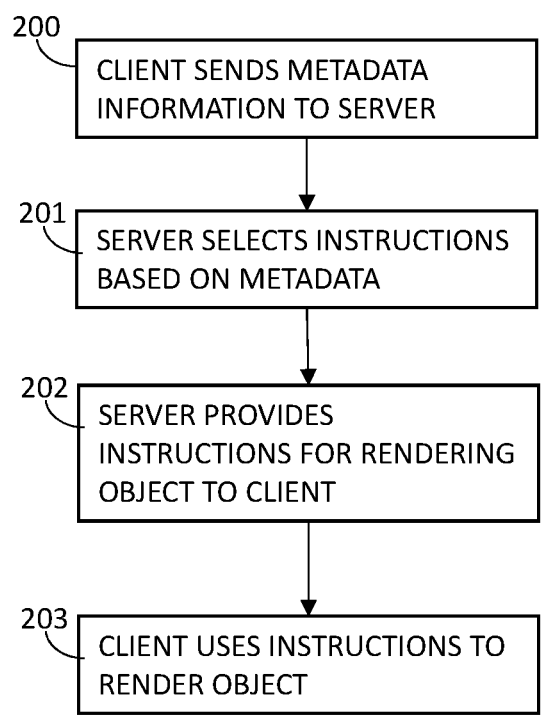
FIG. 6 shows a flowchart for a method.

With reference to FIGS. 4-6, in one embodiment, the graphical environment, when it is a virtual reality environment, 1 has placeholders 11 for placing objects 6, such as advertisements. The placeholder 11 at least defines where in the graphical environment 1 an object 6 is to be rendered. For example, the placeholder 11 may define x, y and z coordinates for the centroid of the object 6 to be rendered in the placeholder. The coordinates may be coordinates in a model of a three-dimensional model that is used for rendering the graphical environment 1. The placeholder 11 can specify various properties of the object 6. Such properties may include shape and size for the object 6 to be rendered. Alternatively, for example if the placeholder defines a flat rectangular area, the placeholder 11 may define the x, y and z coordinates for each of the four corners of the rectangular object 6. The placeholder 11 may also comprise an orientation, preferably defined as three angles in relation to the point of observation.

The placeholder 11 may be associated with metadata. In a preferred embodiment information about the context of the placeholder 11 may be metadata to the placeholder 11. Example of such contexts are graphical properties of the area surrounding the placeholder for example brightness, time of day (for example daytime, night time) lighting conditions, indoor or outdoor scene, historic context, geographic context etc. etc.

Before rendering of the graphical environment 1 takes place by the rendering software 5 the graphical environment 1 may be edited with the use of an editing software. This can suitably be done by a person (for example a game designer) in connection with the design of the graphical environment 1 and is done in advance of the rendering of the graphical environment to the user 20. The editing software may allow the creation of placeholders 11, for example by specifying where in the graphical environment 1 a placeholder 11 should be located. The editing software may also allow the user/editor to define the size and shape of placeholders 11. The editing software preferably has a GUI that displays the graphical environment 1 to the user/editor (not necessarily through a head mounted device). The editing software may also allow for creating metadata for a placeholder 11. Metadata as context may be selected from a pre-defined range of contexts. For example, a number of available context classes may be selectable from a menu. For example, the selectable predefined contexts may be: 1. Day scene 2. Night Scene 3. Dawn/dusk scene. This enable selection of instructions 10 for an object 6 of which the colour and brightness conditions suits the surroundings (in the graphical environment) as described below.

When (i.e. after the user/editor has defined the placeholder 11) the graphical environment 1 is to be rendered, the VR device 4 may ask the server 8 for an object 6 to be included at the location of the placeholder 11 in the graphical environment 1. The object instruction selection software 16 of the server 8 then selects instructions 10 for an object 6 and provides the instructions 10 to the VR device 4, which renders the object 6 in the graphical environment 1 at the position in the graphical environment 1 defined by the placeholder 11.

The selection of instruction 10 for object 6 from the database 9 by object instruction selection software 16 may be done based on a wide variety of parameters, for example shape of the placeholder 11. When the placeholder 11 defines a size and shape of the object 6 to be rendered, the selection is done so that the size and shape of the object 6 fits the placeholder 11. For example, the object 6 may have to have a certain size or shape in order to be selected, such that the object 6 fits the placeholder 11. Preferably rendering software 5 is able to scale object 6 to fit the placeholder 11 with the use of instructions 10. In a preferred embodiment selection is based on the metadata associated with placeholder 11 so that the metadata of the instruction 10 matches the metadata of the placeholder 11. Metadata may be used to select instructions 10 for an object 6 that fits the context of the area surrounding the placeholder 11. For example, when the area surrounding the placeholder 11 has a certain context a suitable object 6 may be rendered. As an example, if graphical environment 1 shows a night scene outside a bar in an adult game it may be appropriate to show an advertisement for a beer. A beer advertisement, however may not be appropriate for a children's game.

This is shown in FIG. 6 where in step 200 the VR device 4 provides metadata to the server 8, which in step 201 selects instructions 10 for rendering an object 6 based on the metadata. In step 202 the server provides the instructions 10 to the VR system 4. The VR system may store the instruction in its memory. In step 203 the VR system 4 renders the object 6 in the graphical environment 1 with the use of instruction 10. The steps may be repeated for a certain placeholder 11. Thus, a new object 6 is displayed in the placeholder at a different occasion, for example the next time a user plays a virtual game.

Selection of instruction 10 may also be based on the title of a video game, operating system of VR device 4, hardware of VR device, geographical location of the VR device, network provider, network technology and identity of client device.

Rendering software 5 may be configured to connect to server 8 and download or stream data 10 for objects 6, at suitable time points. In order to prevent delay in rendering it is preferably ensured that the instructions 10 are downloaded to the client well in advance of rendering. This has the advantage of decreasing latency for rendering graphical environment 1. Preferably the request is stent from the client to the server 8 at the latest when the client begins to render the graphical environment 1. Client may for example send a request at the start-up of at start-up of the rendering software 5. Request and download may also be triggered by rendering software 5 beginning to render the graphical environment, or with the use of any other useful schedule. For example, the client may send request for placeholders 11 that are "close" to the point of view of the user 20, anticipating that the virtual point of view of the observer may change such that those placeholders 11 may soon be visible. For example, if the user 20 is moving or driving down a street. In any case it is preferred that the client sends the request for instructions before the area of the graphical environment that contains the placeholder 11 is rendered.

In a preferred embodiment a request is sent by client and data 10 is downloaded to the client at start-up of rendering software 5 (caused by user). Thus, request from client may be caused by the loading of instructions for rendering the graphical environment (apart from object 6) to the RAM of the client. Also, rendering software may comprise a number of different graphical environments, such as different scenes or games, and the user may be able to select which graphical environment to display. The request from the client may be triggered by such a selection. In general, the request may be triggered by the client receiving input from the user, for example input that causes the client to begin to render or display the graphical environment 1.

One embodiment of the invention provides a method for determining if an object 6 in a virtual realty or augmented reality graphical environment 1 has been observed by a user 20. The method provides a method for determining that a user 20 likely has observed an object 6 rendered in the graphical environment 1.

Figure 7A:
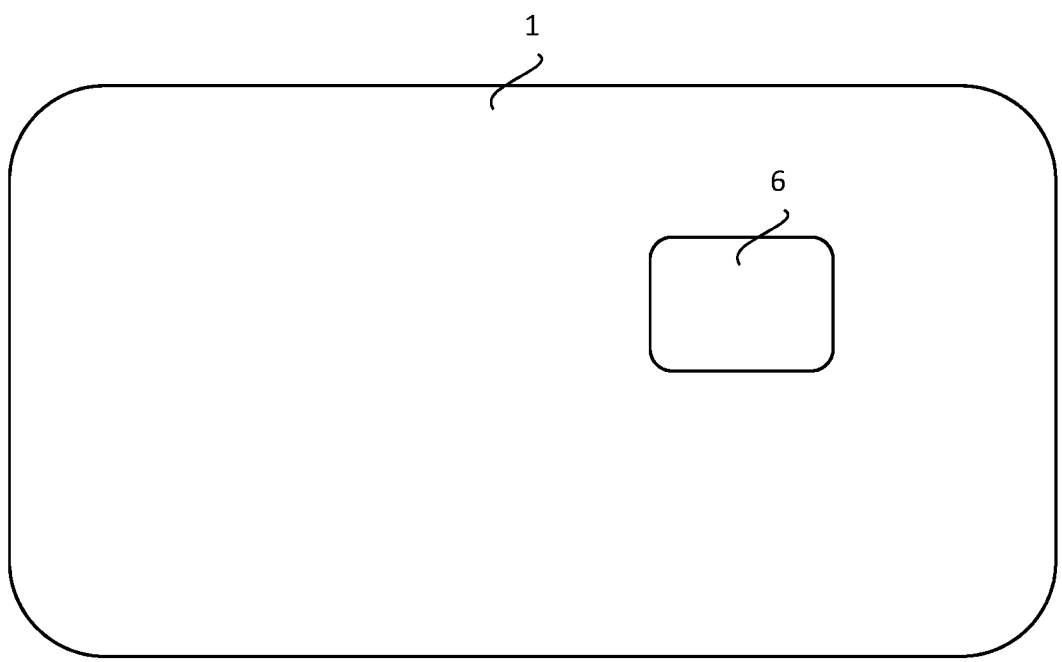
FIG. 7A schematically shows area of field of view and an object.

The method may involve determining the geometric proportion (proportion of area), called S herein, of the size of the object 6 in relation to the total field of view generated in the graphical environment 1. The total field of view of the graphical environment 1 may be defined as the area of display 2. The proportion is determined with the aid of area proportion determination software 22 that may receive data from rendering software 5. Thus, rendering software 5 can be configured to provide such data to area proportion determination software 22. In FIG. 7A the field of view of the graphical environment 1 is indicated with 1 and may be defined as the area of the display 3. The graphical environment 1 comprises virtual object 6. S may be determined by calculating the proportion of the number of pixels used to render the object 6 to the number of pixels used by the display 3 of the device 2 to render the graphical environment 1. S may, for example, be determined by calculating the number of pixels of the object 6 and dividing by the number of pixels used by the display 3 of the device 2. For example, if an object 6 is rendered by 10 000 pixels and the display is 1 000 000 pixels, S will be 1% of the total field of view.

The proportion may also be determined in other ways, for example by dividing area of the display with the area of object 6 to obtain the inverse value to the value above, in which case $S_{max}$ may be used instead of $S_{min}$, below. Also, the area of the field of view not displaying object 6 may be used in relation to area of object 6. There may be other suitable ways to determine the proportion of field of view that an object occupies in the graphical environment.

The graphical environment 1 is usually projected on two screens, each showing the object 6 from a slightly different angle to create a stereoscopic image and S can be calculated for the total number of pixels in both displays.

The method may involve determining the value of S for various time points. Suitably S is determined with a predetermined frequency, which may be at least every 0.2 seconds, more preferably at least every 0.1 seconds. The graphical environment 1 is generated with a certain frequency, for example 60-175 times per second. The time points for determining S are suitable the same as for updating the graphical environment. Thus, the predetermined frequency may be the rendering frequency.

S may be used to determine if an object 6 has been observed at a certain time point. For example, if S is below a threshold, the object can be deemed to have not been observed.

In one embodiment, for each time point the observation detection software 7 of the system 100 decides if S is larger than a predetermined threshold $S_{min}$. Observation detection software 7 may do this with the aid of data from area proportion detection software 22, and a timer. Timing may for example be done by using the sampling frequency and the number of time points. When S is larger than $S_{min}$ in the system 100 may determine for how long time S is larger than $S_{min}$, resulting in a time window for which S is larger than $S_{min}$.

For example, if the user 20 experiences driving a car in the virtual environment, an object 6 rendered as a billboard on the side of the road that is being approached by the user 20 will at first have a low value of S. The value of S will increase as the user approaches the billboard and the billboard fills a larger proportion of the display 3.

An object 6 perceived as large by an average user 20 in a graphical environment 1 has a surprisingly small value of S. A suitable value of $S_{min}$ when S is determined as the area of the object on the display 3 divided with the area of the display 3 may be from 0.05% to 3%, where 0.1% to 2% is preferred, and 0.3% to 1% is even more preferred.

The end of the time window is the time point where S falls below $S_{min}$. For each time window T during which S is larger than $S_{min}$ it is determined if the time T is larger than a predetermined threshold $T_{min}$, and if T is greater than $T_{min}$, the object is classified as having been observed by the user.

This has the effect that, in order to be considered as observed, the object 6 has to be rendered with a certain size over a certain time. Otherwise it is not classified as have been observed by the user 20.

A suitable value of $T_{min}$ can be from 0.2 seconds to 5 seconds, where from 0.5 seconds to 4 seconds is more preferred.

There may be two or more values of $S_{min}$ such that there may be $S_{min1} S_{min2}, \ldots S_{minn}$, where each value of $S_{min}$ has its own $T_{min}$, such that there are $T_{min1}, T_{min2} \ldots T_{min\ n}$ and where a higher value of $S_{min}$ has a lower value of $T_{min}$. This has the effect that a larger object 6 needs a shorter time for being classified as observed. Thus, an object 6 that increases in size fast may perhaps not trigger the $T_{min1}$ but instead trigger $T_{min2}$.

Figure 7B:
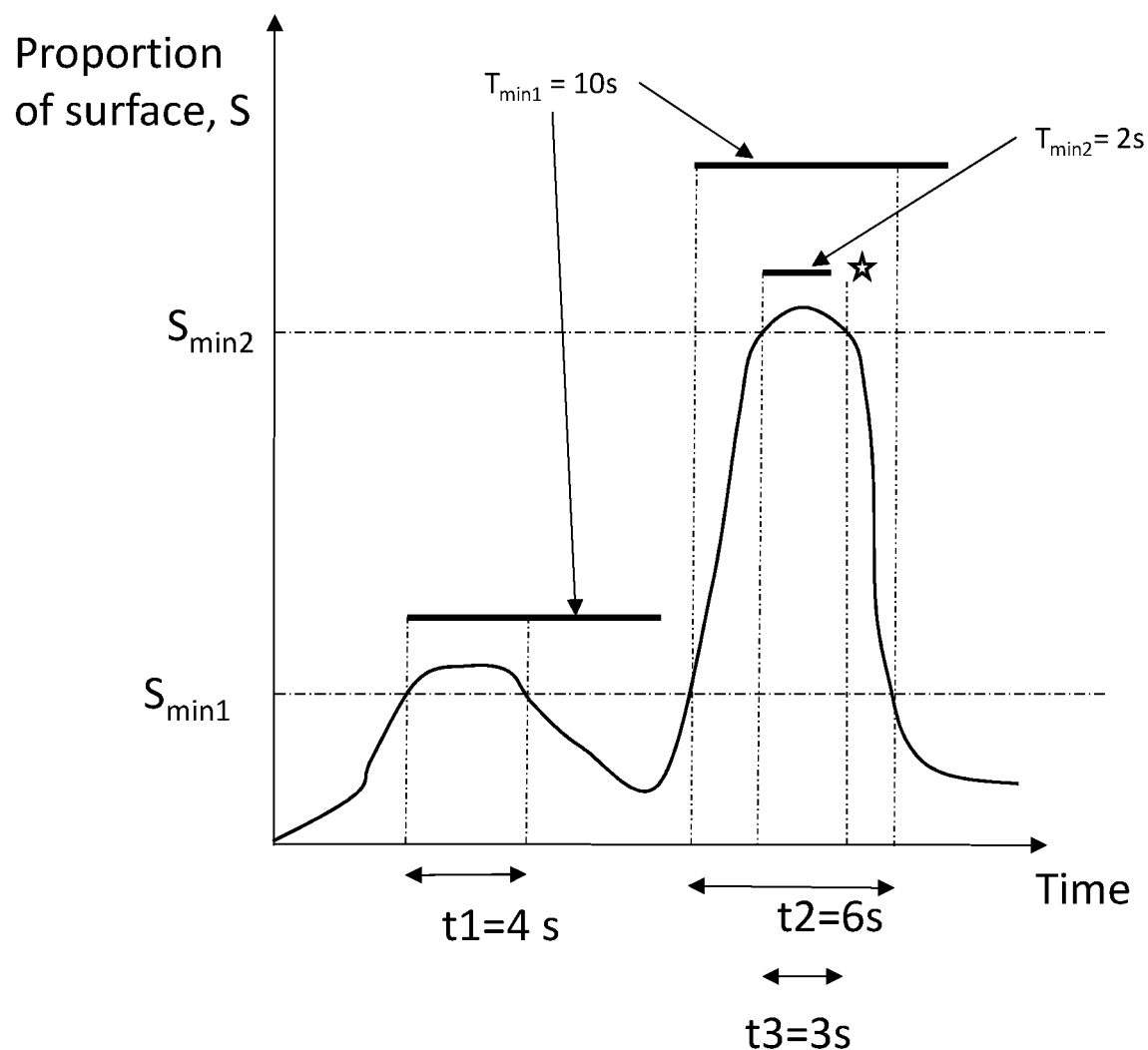
FIG. 7B shows a graph for a hypothetical example.

FIG. 7B shows a graph for a hypothetical example where S varies with time for one object 6, when the object 6 moves in relation to the point of observation 13. In this example $T_{min1}$ is 10 seconds for $S_{min1}$, and $T_{min2}$ is 2 seconds for $S_{min2}$. Object 6 first appears and grows in size, then recedes, then grows again and then becomes smaller, resulting in two peaks on the S-axis. In this example, S is greater than $S_{min1}$ for time windows $t_1$ (4 s) and $t_2$ (6 s) and S is greater than $S_{min2}$ for time window $t_3$ (3 s). Only t3 triggers the registration of observation since only $t_3$ is longer than $T_{min}$ (indicated by a star in FIG. 7B). The data is summarized in Table 1.

Tabe 1

| Time window | Time above $S_{min}$ (s) | $T_{min}$ (S) | Observation |
|---|---|---|---|
| $t_1$ | 4 | 10 ($T_{min1}$) | No |
| $t_2$ | 6 | 10 ($T_{min1}$) | No |
| $t_3$ | 3 | 2 ($T_{min2}$) | Yes |

The procedure may be carried out in real time such that the time windows is determined in real time. However, the timing can also be determined with a certain lag. The windows may also be determined after rendering of the graphical environment 1. Thus, a dataset with information about S may be stored for later analysis.

In one embodiment the area under the curve that shows S as a function of time may be used. For example, the area under the curve, but above $S_{min}$. A threshold may then be a minimum area under the curve. Numerical methods may be used for determining the area under the curve.

The determination of time windows for which T is larger than $T_{min}$ may be carried out by the VR device 4 or by a server 8. For example, a data set with S and T may be transferred to a server 8 that determines S and T, or other parameters (see below) later. If the bandwidth is limited, the VR device 4 may more suitable to carry the determination if it is to be done in real time. The VR device 4 may then transfer information that object 6 that has been observed to a server 8. When the object 6 is an advertisement, payment for the advertisements can thereby be based on an observation as described herein. The server 8 may maintain a database 24 of the number of observations of objects 6. The database 24 is suitable logically associated with object database 9 comprising instructions 10, such that a user of server 8 may see which instructions 10 that has resulted in many observations. An instruction 10 that results in few observations may be down prioritized such that is shown less often to users. This may off course be carried automatically by server 8. To provide an updated database 24 it is preferred that observation detection takes place at VR device 4 and VR device 4 sends information about views for each object 6 to server 8. This may be done at suitable intervals. The server 8 adds the information about object views to the database 24. If observation detection takes place at the server 8 very large datasets must be transferred from the client to the server 8.

S may be modified as described below.

Figure 8:
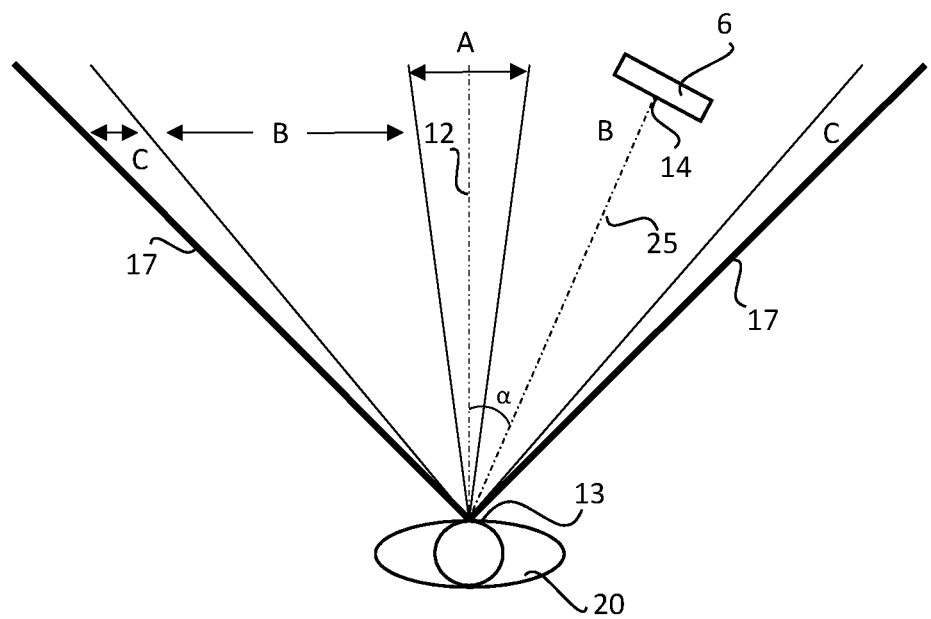
FIGS. 8-9 shows examples of the horizontal direction of observation in relation to objects in a graphical environment.
Figure 9:
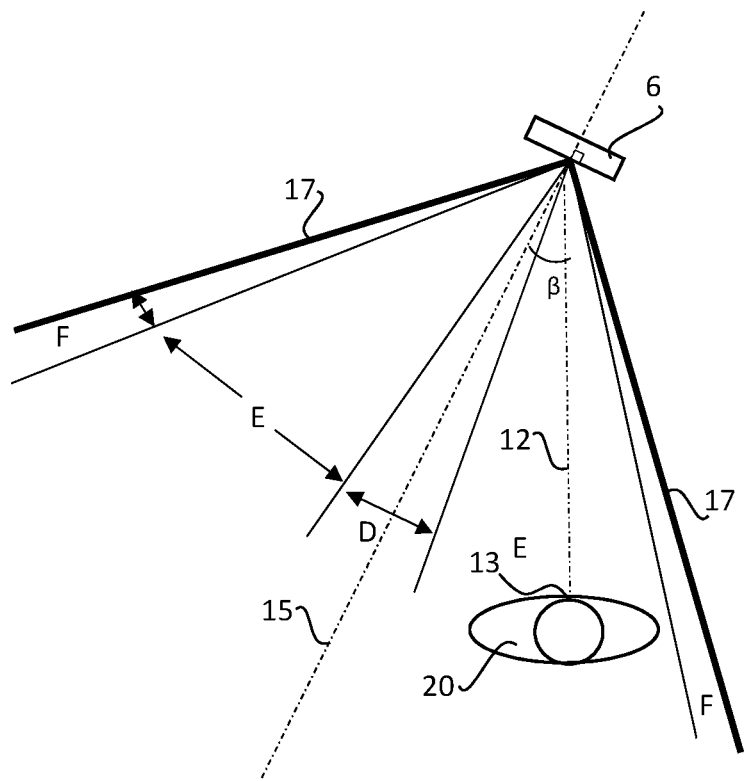

FIG. 8 schematically shows the field of vision in a graphical environment 1 as seen from an imagined point of view above the user 20. In FIGS. 8 and 9 "20" indicates the virtual position of the user, not the real user. In FIGS. 8 and 9, lines 12, 15 and 25 indicate vertical planes. The virtual position of the user 20 has a point of observation 13. The displayed field of vision is usually around 90°-110° in a device 2 and is shown as limited by lines 17. An object 6 that is in the periphery of the field of vision, for example in zones B or C, may be more difficult to observe by the user 20, than an object 6 that is located right in front of the user 20 such as an object 6 located in zone A.

A method may take this into account by using a factor K (viewing angle coefficient) which is dependent on the angle α between the horizontal direction of observation 12 of the user 20 in the graphical environment 1 and the horizontal direction 25 from the point of observation 13 of the user to a predefined point of the object 6, for example the middle 14 of the object 6. The predefined point of the object 6 may be point that is visible from the point of observation 13 of the user. α may also be expressed as the angle between a vertical plane defined by the direction of observation 12 and a vertical plane defined by direction 25 that goes through a predefined visible point on the object 6.

The predefined point of the object 6 that defines line 25 may be any other visible predefined point of the object, such as for example the point of the object 6 that is either i) closest to the horizontal line of observation 12 or ii) farthest away from the horizontal line of observation 12.

The middle 14 of the object 6 may be the centroid of the object 6 when the object 6 is flat. When the object 6 is not flat, the middle 14 of the object 6 may be the centroid of the object, when the object 6 is observed from a point where the object would occupy the largest possible geometric proportion of the field of view.

K can for example be used to modify S as described below but may also be used in other ways.

K can be used to modify the observed value of S ($S_{obs}$) (as determined above) by multiplying with K to obtain a modified value of S, $S_{mod}$:

$$S_{mod}=S_{obs}\times K$$

Preferably K is 0, 1 or a value between 0 and 1, in particular when K is cos α for certain angles, however it is important to note that any useful value for K can be used.

$S_{mod}$ is then used for determination of observation as described above.

Thus, for example, if observed S is 0.6% and K is 0.5 modified S is 0.6×0.5=0.3%. This has the effect of making objects close to the periphery of the field of vision "smaller" when determining if an object 6 has been observed. An object 6 in the periphery thus have to be relatively larger in order to be classified as observed.

There may be at last two different values of K, where the higher values apply to lower value of α. In general K decreases with higher value of a such that $$K_{\alpha 1} \geq K_{\alpha 2} \text{ when } \alpha 1 < \alpha 2$$

K may vary continuously with the angle α. For example, K may be cos α, or may be dependent on cos α for at least some values of α. K may for example be dependent on cos α when α is between a lower limit of from 15° to 30° and an upper limit of from 50° to 70°. K may be constant for certain intervals of values of α. For example, when α is larger or equal to 0° but smaller than an upper limit of from 15° to 30°. This interval of a preferably has the highest values of K used in the method. A preferred value of K for this interval is 1, in particular if K is cos α for certain values of α This has the effect of treating objects 6 that are almost straight in front of the viewer as actually being straight in front of the viewer. Alternative values for this interval is 0.9, more preferably 0.95.

K may also be constant when α is larger than a limit value of from 50° to 70°. This interval of α preferably has the lowest values of K used in the method. A preferred value of K for these values of α is 0. This has the effect of never counting a view when the object 6 is in the periphery of the field of vision. This has the effect of treating objects 6 that are close to the periphery of the field of view of the user 20 as not being observed by the user 20. Alternative values for K in this interval is 0.1 more preferably 0.05.

K may be constant (for example having the value 1 or 0) for at least one interval of values for α and vary continuously, for example with cos α, for at last one other interval of values for α, where the two intervals do not overlap.

Thus, the field of vision may have different angular zones for which K have different values, such that K may be constant in certain zones or vary, for example with or vary with cos α, in other zones. The tables below show examples of sets of values for K.

Example of Values of K, First Example

| Angle α | K | Zone in FIG. 8 |
| --- | --- | --- |
| 0°-15/30° | 1 | A |
| 15°/30°-50°/70° | cos α | B |
| 50°/70°-90° | 0 | C |

Example of Values of K, Second Example

| Angle α | K | Zone in FIG. 8 |
| --- | --- | --- |
| 0°-15/30° | 10 | A |
| 15°/30°-50°/70° | 1 | B |
| 50°/70°-90° | 0 | C |

FIG. 9 also schematically shows the field of vision in a graphical environment 1 as seen from above an imagined point of view above the user 20. An object 6, in particular an object 6 that is a flat surface, is more difficult to observe when the surface of the object 6 is tilted in relation to the direction of observation 12 of the user 20.

A method may take this into account by using a factor L (incidence angle coefficient) which is dependent on the angle β between a line 15 that is perpendicular to the flat surface of the object 6 and the horizontal line of observation of the user 12. The line that is perpendicular to the flat surface of the object 6 may be directed towards the flat surface. β can also be expressed as the angle between a vertical plane that is defined by the direction of viewing 12 and a vertical plane 15 that is perpendicular to the flat surface of the object 6.

L can be used to modify S as described below but may also be used in other ways.

L can be used to modify the observed value of S ($S_{obs}$) (as determined above) by multiplying with L to obtain a modified value of S, $S_{mod}$:

$$S_{mod}=S_{obs}\times L$$

Preferably L is 0, 1 or a value between 0 and 1, in particular when L is cos β for certain angles, however it is important to note that any useful value for L can be used.

$S_{mod}$ is then used for determination of observation as described above.

Thus, for example, if S is 0.6% and L is 0.2 modified S is 0.6%×0.2=0.12%. This has the effect of making tilted objects 6 even "smaller". A tilted object 6 thus has to be relatively larger in order to be considered as observed.

There may be at last two different values of L, where the higher values applies to lower value of β. In general L decreases with higher value of β such that $$L_{\beta 1} \geq L_{\beta 2} \text{ when } \beta 1 < \beta 2$$

L may vary continuously with the angle β. For example, L may be cos β or be dependent on cos β for at least some values of β. L may for example be dependent on cos β when β is between a lower limit of from 50° to 70° and an upper limit of from 75° to 85°.

L may be constant for certain intervals of values of β. For example, when β is larger than or equal to 0° but smaller than an upper limit of from 50° to 70°. This interval of β preferably has the highest value of L, in particular if L is cos β for certain values of β. A suitable value for this interval of β is 1. This has the effect of treating small tilts of object 6 as if the objects 6 had no tilt. Other suitable values for L in this interval is 0.9 more preferably 0.95. Moreover, L may be constant when β is larger than a limit value of from 75° to 85. This interval of β preferably has the lowest values of L used in the method. A suitable value for L in this interval of β is 0. This has the effect of treating large tilts as if the object 6 is not visible at all. Other suitable values for L in this interval is 0.05 more preferably 0.1. This is importance because it is very difficult to perceive and congenitally understand even large flat objects if they are tilted too much.

L may be constant, for example having the value 1 or 0, for at least one interval of values for β and vary continuously (for example depend on cos β) for at last one other interval of values for β, where the two intervals do not overlap.

Thus, the object may have different angular zones for which L have different values, may be constant or vary with cos β.

When the object 6 has a non-flat surface, for example a surface that is slightly curved, it is not possible to establish one line that is perpendicular to the surface. In that case a hypothetical line of observation where the object would occupy the largest possible geometric proportion (area proportion) of the field of view can be used instead of a line that is perpendicular to the surface. The angle between this line and the actual line of observation forms the angle β.

Examples of Values of L, First Example

| Angle β | L | Zone in FIG. 9 |
|---|---|---|
| 0-50/70 | 1 | D |
| 50/70-75/85 | cos β | E |
| 75/85-90 | 0 | F |

Example of Values of S, Second Example

| Angle β | L | Zone in FIG. 9 |
|---|---|---|
| 0-50/70 | 10 | D |
| 50/70-75/85 | 1 | E |
| 75/85-90 | 0 | F |

In certain embodiments, both K and L may affect S such that both the direction and observation and the tilt of the object affects S as follows:

$$S_{mod} = S_{obs} \times L \times K$$

In general, S may be measured by area proportion determination software 22 and provided to observation detection software 7. Observation detection software 7 may comprise thresholds $S_{min}$ and $T_{min}$.

α and β may be determined by angle determination software 23 and provided to observation detection software 7. Values for K and L may be stored in observation detection software 7, for example as a lookup table. The calculation of $S_{mod}$ may be carried out by observation detection software 7.

Figure 10:
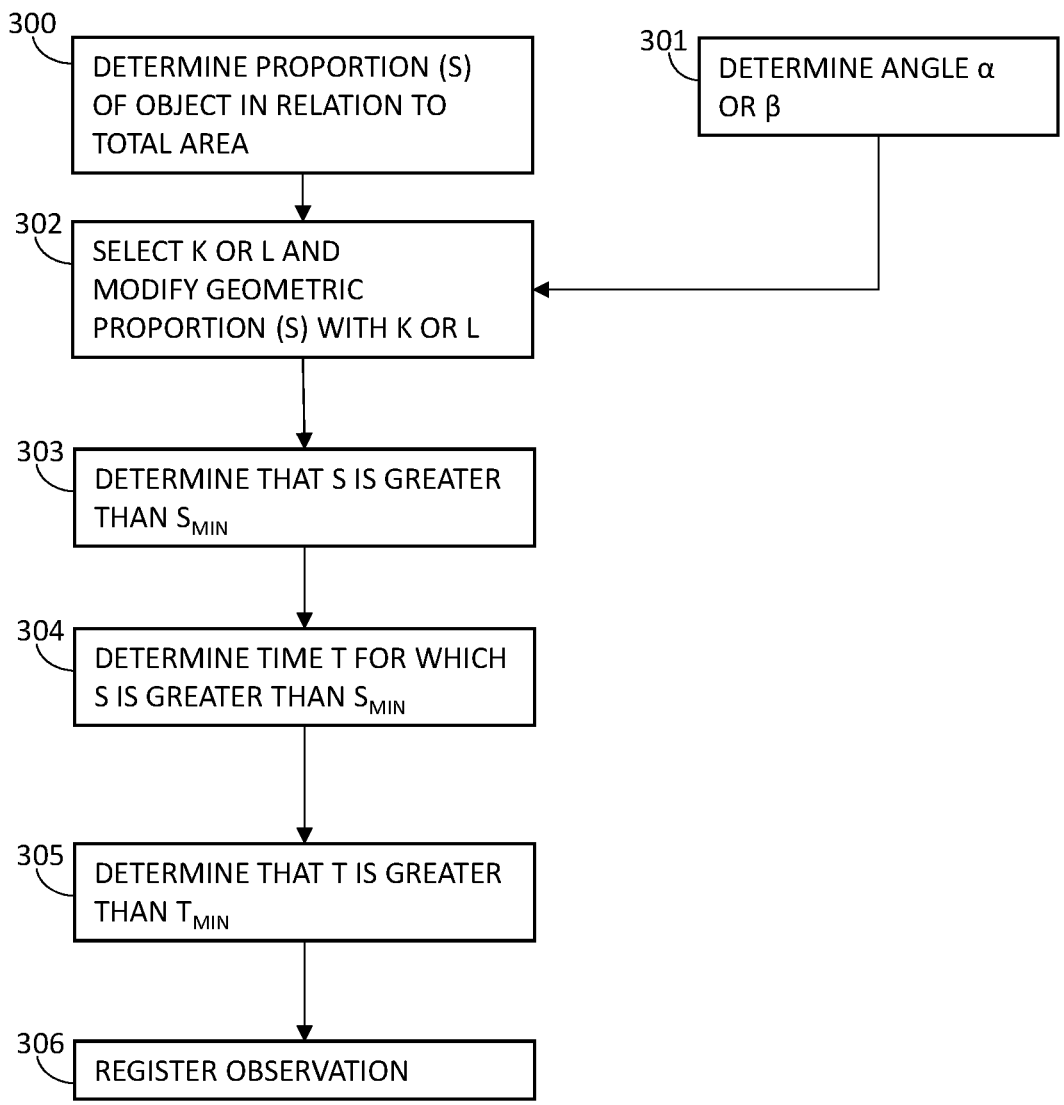
FIGS. 10-11 are flowcharts showing methods.

Thus, a method may comprise the following steps, with reference to FIG. 10. However, many variations are possible.

In step 300 the area proportion determination software 22 determines the geometric proportion of the object 6 in relation to the field of view and provides the data to the observation detection software 7. The proportion may be determined by area proportion determination software 22 with the use of data from rendering software 5. For example, the number of pixels used to render the object on the display 3 may be provided to the area proportion determination software 22.

In step 301 the angle determination software 23 determines the angles α and/or β. The values are provided to the observation detection software 7. Thus, observation detection software 7 receives this data. Step 301 can be carried out at the same time as step 300, and preferably for the same time points. Steps 301 and 302 are optional.

In step 302, K and/or L is selected by observation detection software 7 with the use of α and/or β and used to modify S to obtain $S_{mod}$.

In step 303 observation detection software determines if S is larger than $S_{min}$. Steps 300-303 is preferably made for a number of consecutive time points. In step 304 it is determined for how long time T during which S is greater than $S_{min}$.

In step 305, it is determined that T is longer than $T_{min}$, an observation is registered in step 306.

Above, K and L is calculated in relation to the horizontal direction 12 of observation. The horizontal direction 12 is preferably used. However, correction factors may also be calculated for the vertical direction of observation and/or vertical tilt of the object. This may be done in the same way as for K and L. However, the horizontal direction of observation is preferred.

The factors K and L may also be used separately from S. Thus, in various embodiments of the invention K or L may be used to modify another factor than S that determines if an object has been seen by a user. For example, K or L may be used for determining that an object that has been rendered in a graphical environment has not been seen by a user, for example when K=0 or L=0. As yet an example, K or L may be used for determining that an object that has been rendered in a graphical environment has been seen by a user, for example when K=1 or L=1.

Figure 11:
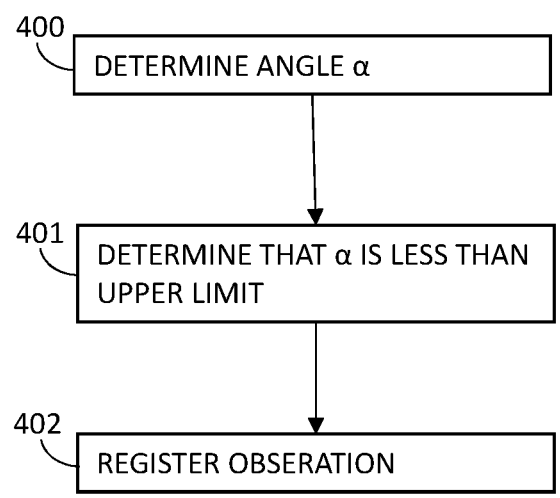

Furthermore, the values of α and/or β can be used to determine if an object has been observed or has not been observed by a user. For example, an object 6 can be classified as observed if α is larger or equal to 0° but smaller than an upper limit of from 15° to 30° or if β is larger than or equal to 0° but smaller than an upper limit of from 50° to 70°. In a similar manner an object can be classified as not observed if α is larger than a limit value of from 50° to 70° or if β is larger than a limit value of from 75° to 85°. This is useful for example if the size of the object 6 is fixed, for example because it is known that the user 20 will be able to look at objects 6 with a certain size for a certain time. In that case, S does not have to be determined. For example, the graphical environment 1 is a virtual environment where the user 20 experiences driving a car and it known that the user 20 will be able to see a certain billboard with a certain minimum size (for example because it is next to a red light in the virtual environment). However, it cannot be excluded that the user chooses to avert his or her gaze in order not to see the billboard. This embodiment solves that problem without the use of S With reference to FIG. 11, in step 400 α or β or both for an object 6 is determined by angle determination software 23 (FIG. 11 shows α only). The value is transferred to observation detection software 7. In step 401 it is determined that α is less than an upper limit which may be from 15° to 30° or determined that β is smaller than an upper limit which may be from 50° to 70°. In step 402 the observation of object 6 is registered by observation detection software 7.

The methods and system 100 can be used to detect if an advertisement object 6 likely has been observed by a user 20. Thus, the method and the system 100 can be incorporated in an ad tech solution for counting the number of views of an advertisement. The method may also be used to detect if other types of objects 6 likely has been observed by a user 20.

Above it is described how K and L is used based on the direction of observation of the direction of viewing, and where it is assumed that the user looks straight forward in the head, worn device, i.e. in the direction that the nose is pointing. In separate embodiments the eye movements of the user are detected, for example with the user of one or more sensors inside the head mounted device 2. The direction of viewing can then be established based on the rotation of the eyeball in the eye socket of the user.

The method may comprise rendering an object 6 in a virtual reality graphical environment 1, for example by a server 8 selecting an instruction 10 for an object 6 and providing it to a VR device 4, the VR device rendering the object 6 for a placeholder 11, and then detecting if the object 6 has been observed by a user 20, by using any of the methods described herein. For example, by measuring T and/or S, and determining K or L.

While the invention has been described with reference to specific exemplary embodiments, the description is in general only intended to illustrate the inventive concept and should not be taken as limiting the scope of the invention. The invention is generally defined by the claims.

What is claimed is:

1. A method for determining if an object rendered on a display has been observed by a user, said object being rendered in a computer-generated graphical environment provided on the display to a user, the method comprising the steps of:
   a) using proportion determination software to determine the display area that is used to render the object,
   b) using the proportion determination software to determine the proportion (S) of the area of step a) in relation to the total field of view generated in the graphical environment,
   c) the proportion determination software providing S to observation determination software,
   d) using the observation detection software to determine if the proportion of the display area used to render the object is larger than a predetermined threshold value (Smin), and, if S is larger than Smin, determining for how long time (T) that S is greater than Smin, and
   if T is greater than a predetermined time Tmin, determining that the object has been observed by the user.

2. The method of claim 1 where there is a first threshold value Smin1 and a second threshold value Smin2 and where the method comprises
   i. determining for how long time S is larger than Smin1, and
   ii. determining for how long time S is larger than Smin2, and
   if the time determined in i) is greater than a predetermined time Tmin1, or if the time determined in step ii) is greater than a predetermined time Tmin2, determining that the object has been observed by the user,
   where Tmin1>Tmin2 when Smin1<Smin2.

3. The method of claim 1 where Tmin is between 0.2 seconds and 5 seconds.

4. The method of claim 1 where Smin is determined by dividing the area of the object with the area of the total field of view and Smin is between 0.05% and 3% of the total field of view generated in the computer generated graphical environment.

5. The method of claim 1 where the object has a flat surface and the proportion S is modified by an incidence angle coefficient L, where L is selected based on the angle β between a vertical plane that is defined by the direction of observation and a vertical plane that is perpendicular to the flat surface of the object, where β is determined by the angle determination software.

6. The method of claim 5 where L is constant for at least one interval of values of β.

7. The method of claim 5 where L is constant when β is larger than or equal to 0° but smaller than an upper limit of from 50° to 70°.

8. The method of claim 5 where L is constant when β is larger than a limit value of from 75° to 85°.

9. The method of claim 8 where L=0 when β is larger than a limit value of from 75° to 85°.

10. The method of claim 5 where L is dependent on cos β when β is between a lower limit of from 50° to 70° and an upper limit of from 75° to 85°.

11. The method of claim 5 where L is constant for at least one interval of values of β and varies continuously for at least one other interval of values of β, where the two intervals do not overlap.

12. The method of claim 1 where the graphical environment is rendered by using pixels of the display and S is determined by calculating the proportion of the number of pixels used to render the object to the number of pixels used by the display of the device to render the graphical environment.

13. A system comprising a device for rendering a graphical environment provided to a user on a display, said system comprising a computer with a memory, the memory comprising observation detection software and area proportion determination software, and angle determination software,
   said area proportion determination software being configured to determine the area of the display that is used to render the object, and to determine the proportion (S) of the area in relation to the total field of view of the graphical environment, and configured to provide S to the observation detection software,
   said observation detection software being configured to receive S from the area determination software and configured to determine if S is larger than a predetermined threshold value (Smin), and configured to, if S is larger than Smin, determining for how long time (T) that S is greater than Smin, and configured to, if T is greater than a predetermined time Tmin, determine that the object has been observed by the user.

14. The system of claim 13 where the object has a flat surface and the proportion S is modified by an incidence angle coefficient L, where L is selected based on the angle β between a vertical plane that is defined by the direction of observation and a vertical plane that is perpendicular to the flat surface of the object, where β is determined by the angle determination software.

15. The system of claim 14 where L is constant for at least one interval of values of β.

* * * * *

UNITED STATES PATENT AND TRADEMARK OFFICE
CERTIFICATE OF CORRECTION

| | |
|---|---|
| PATENT NO. | : 11,256,091 B2 |
| APPLICATION NO. | : 17/087778 |
| DATED | : February 22, 2022 |
| INVENTOR(S) | : Niklas Bakos and Niclas Kjellgren |

It is certified that error appears in the above-identified patent and that said Letters Patent is hereby corrected as shown below:

In the Claims

- Claim 1, Line 13, please change --observation determination software-- to "observation detection software".
- Claim 13, Line 8, please change --the object-- to "an object".
- Claim 13, Line 13, please change --area determination software-- to "area proportion determination software".

Signed and Sealed this
Thirteenth Day of September, 2022

Katherine Kelly Vidal
*Director of the United States Patent and Trademark Office*